April 13, 1965    T. H. JOHNSON    3,178,312
SOLUTIONS AND METHODS FOR DEPOSITING LEAD SELENIDE
Filed Jan. 2, 1959

Thomas H. Johnson,
INVENTOR.

BY.

ATTORNEY.

United States Patent Office 3,178,312
Patented Apr. 13, 1965

3,178,312
SOLUTIONS AND METHODS FOR DEPOSITING
LEAD SELENIDE
Thomas H. Johnson, Santa Barbara, Calif., assignor to Santa Barbara Research Center, Goleta, Calif., a corporation of California
Filed Jan. 2, 1959, Ser. No. 784,820
17 Claims. (Cl. 117—201)

This invention relates to methods for preparing materials which are sensitive to electromagnetic radiation of long wavelengths such as radiation in the infrared spectrum. More particularly, the invention relates to methods for forming in situ on a substrate a polycrystalline layer or thin film of lead selenide by chemical deposition.

Apparatus and devices capable of providing an indication of the presence of an infrared radiating source have become extremely important, particularly in the field of military defense against jet or rocket-powered aircraft and missiles. The detection of such aircraft or missiles by infrared sensitive apparatus is particularly attractive in view of the passive nature of infrared detection, since such vehicles are excellent radiating sources of infrared energy. While active target detection systems such as radar may be rendered useless or inoperative by jamming and the like, it is extremely difficult if not impossible to shield a jet or rocket motor so that it will not radiate infrared energy. The use of infrared detecting apparatus is also of importance in the area of air traffic control to prevent collisions and the like.

Many materials are known which can be excited by the absorption of infrared energy to provide a useful electrical signal. Some detectors of infrared energy such as a bolometer take advantage of the fact that a change in conductivity occurs in the material when heating thereof is caused by infrared radiation; this change in conductivity is thus useable to modulate a signal impressed across the infrared sensitive material. While such devices are entirely satisfactory for some purposes, the time constant of such devices is inherently long because their operation depends entirely upon a thermal effect. Another type of detector employs certain materials which operate on the photoconductive principle; that is, when excited by absorption of infrared energy there is change in conductivity in the material. Certain photoconductive materials can be prepared which have very short time constants, for example, of the order of microseconds as compared with the time constant of bolometer-type materials which is of the order of hundredths of a second.

In detecting infrared energy transmitted through the atmosphere at great distances it has been found that the atmosphere itself acts as a filter and tends to pass only certain infrared wavelengths. Likewise, many infrared radiating sources such as jet or rocket engines emit a maximum amount of their infrared energy at certain wavelengths (at which they are said to provide "peak" emission). It thus becomes necessary to design detectors for such targets which have maximum sensitivity to infrared energy at the "pass" wavelength of the atmosphere as well as at the "peak" wavelength of the targets to be detected. Fortunately, the "peak" infrared radiation of most jet and rocket engines occurs at wavelengths (i.e., 3 to 5 microns) which fall within the normal atmospheric "window" or pass band for electromagnetic energy.

One of the most sensitive materials for the detection of infrared energy at the wavelengths of interest is lead selenide. A detection device utilizing this material comprises a thin film of lead selenide on a substrate with leads connected to opposite sides of the thin film or layer. It has been known to form the thin layer of lead selenide by either vacuum evaporation and deposition onto the substrate or by chemically depositing thereon the lead selenide from solution. The vapor deposition technique of the prior art has been found to be extremely difficult to control and severely characterized by erratic reproducibility. On the other hand, the chemical deposition from solution technique has been far from satisfactory prior to the instant invention and more often than not a precipitation of lead selenide as sediment having little or no adherence to the substrate resulted. What is desired is a "mirror-like" film of polycrystalline lead selenide which strongly adheres to the substrate. To produce such a film it is necessary that the chemical reaction be sufficiently controlled so as to permit the growth of the desired microcrystals. Hence the chemical deposition processes of the prior art were relatively complex organic solutions. In such solutions the reactions involved are rarely simple reactions betwen ions; the lifetime of small particles or crystals may be relatively long and will deposit on a substrate as a very thin layer of crystallites which will act as "seeds" for the further growing of the lead selenide film or layer. However, until the present invention, results have not been satisfactory or consistently reproducible. Indeed, the prior art has resorted to the employment of a "seed" layer of lead sulfide in order to obtain a successful "mirror-like" film of lead selenide, since the deposition of lead sulfide is fairly controllable and can be employed to provide a very thin layer of crystallites on which the lead selenide microcrystals may grow. Adherence of the lead selenide to the lead sulfide was excellent. Sensitivity measurements on such an arrangement show, however, a spectral response very similar to a normal lead sulfide layer, hence this technique shows little or no advantage over a straight lead sulfide detector.

It has been discovered that lead selenide may be deposited from solution to form a strongly adherent "mirror-like" film or layer on a substrate such as glass and that the lead selenide film exhibits a much greater sensitivity to infrared energy than heretofore obtainable in the 3–5 micron region. One of the principal requirements for the successful deposition of lead selenide to give the requisite sensitivity has been found to be the provision of an excess of lead ions to selenium ions in the deposition solution.

The invention will be described in greater detail by reference to the drawings in which.

PREPARATION OF MATERIALS AND EQUIPMENT

To successfully produce sensitive lead selenide films having good adherence to a substrate, it is necessary that the substrate and other apparatus with which the deposition solutions and materials may come in contact be thoroughly cleansed and that the deposition materials and chemicals be of the highest degree of purity.

The substrate, which may be of glass or quartz, for example, is first given a finely ground surface finish by grinding one side for about 2 to 3 minutes with an aqueous slurry of an alumdum compound. An example of a suitable abrasive is one identified as "M-302½" Abrasive obtainable from the American Optical Co. of Southbridge, Massachusetts. Thereafter the substrate is vigorously rinsed with deionized water followed by an ultrasonic agitation rinse for about 3 to 5 minutes, likewise with deionized water. The substrate is then subjected to a further ultrasonically-agitated bath for about 30 to 60 minutes in an alcoholic solution of potassium hydroxide (for example, 120 gs. KOH per liter of alcohol). The substrate is then rinsed again ultrasonically for about 3 to 5 minutes in deionized water. The next step is to immerse the substrate in boiling concentrated nitric acid for about 10 to 15 minutes which is followed by a plurality of ultrasonic agitation rinses in deionzed water to remove all traces of nitric acid, each rinse being for about 3 to 5 minutes. An optional procedure to insure the removal and/or neutralization of any nitric acid is to subject the substrate to an ultrasonic agitation rinse in a 0.25% aqueous solution of ammonium hydroxide for about 5 minutes followed by an ultrasonic rinse in deionized water for about 3 to 5 minutes. The thus-cleaned substrate may then be stored in deionized water until ready to be used.

Substrate materials which are satisfactory for the purposes of the invention and which may be cleaned and degreased according to the just-described procedure are: glass, quartz, sapphire, and various ceramics such as strontium titanate, titania, and magnesia-alumina mixtures.

Figure 1:
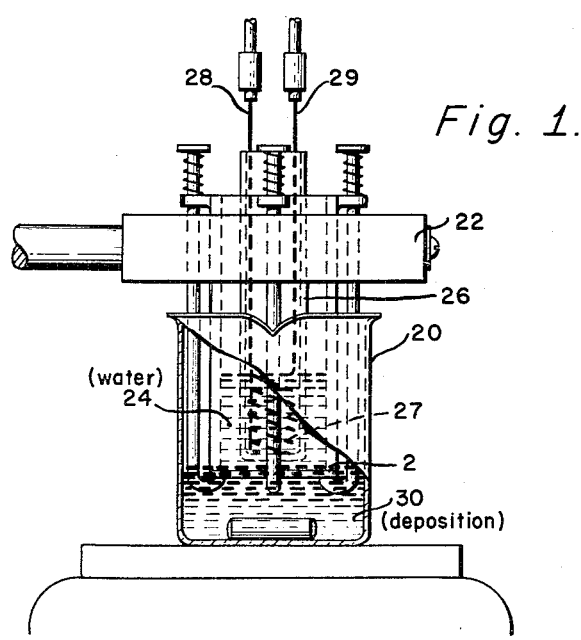
FIG. 1 is an elevational, partially sectional view of apparatus suitable for carrying out the method of the invention.

Glassware employed in the deposition process such as shown in FIG. 1 is cleaned according to the following procedure. The glassware may first be immersed in boiling concentrated nitric acid for about 5 to 10 minutes followed by a thorough rinse with deionized water and then immersion in the aforementioned alcoholic solution of potassium hydroxide for about 5 to 10 minutes. The glassware may then be subjected to a second immersion in boiling concentrated nitric acid for about 5 to 10 minutes which may be followed by a plurality of separate rinses in deionized water. A final optional step to insure complete removal and/or neutralization of all traces of nitric acid may be immersion in a 0.25% aqueous solution of ammonium hydroxide followed by a thorough rinsing with deionized water.

It should be understood that other cleaning techniques than those described may be employed and that the procedures set forth hereinabove serve merely as an example of a suitable procedure which has proven satisfactory.

The materials of the various deposition solutions to be described in later examples are: selenourea, lead acetate, iodine, potassium iodide, and gelatin. Two of these, the selenourea and the lead acetate, are not presently commerically available in the degree of purity desirable for optimum device performance and may be processed as described hereinafter. The other materials (potassium iodide, iodine, and gelatin) are readily obtainable in satisfactory degrees of purity from normal sources.

PREPARATION OF SELENOUREA

The synthesis of selenourea to be described herein involves the following reactions:

(1) $2Al + 3Se \rightarrow Al_2Se_3$
(2) $Al_2Se_3 + (3+X)H_2O \rightarrow 3H_2Se + Al_2O_3 \cdot XH_2O$
(3) $CaNCN + CO_2 + H_2O \rightarrow H_2NCN + CaCO_3$
(4) $H_2NCN + H_2Se \rightarrow SeC(NH_2)_2$ About 330 grams of powdered selenium is thoroughly mixed with 136 grams of powdered aluminum. Three to five grams of the mixture are then ignited in a container by means of a magnesium ribbon. Thereafter, the selenium-aluminum mixture is continually added to the crucible and ignited in small batches of 5 grams each. The aluminum selenide thus formed is then cooled and broken into small chunks which are placed in a flask having a small amount of glass wool in the bottom thereof in order to protect the flask and permit ready accessibility of the aluminum selenide to water employed in a subsequent step to be described for the generation of hydrogen selenide.

About 520 grams of calcium cyanamide is first treated with benzene to remove any oil, and is then filtered and washed with petroleum ether to free the calcium cyanamide powder of all benzene. After the CaNCN powder has been allowed to dry, about 360 grams are placed in a reaction flask with 2 liters of water. The reaction flask is provided with at least three necks one of which is connected to the flask containing the aluminum selenide, with a second neck being connected to a source of $CO_2$. The reaction flask is also provided with a motor stirrer. The entire system is purged with nitrogen gas for about 10 minutes after which water is added at a slow rate, dropwise, to fall onto the chunks of aluminum selenide to start generation of hydrogen selenide. The hydrogen selenide generator is purged gently with a stream of nitrogen gas during the entire operation while a stream of $CO_2$ is passed into the reaction flask. The reaction solution is maintained at about $50° \pm 2°$ C. throughout the reaction.

Upon completion of the reaction, which takes about two hours in the process described, the selenourea solution is drawn off into a second flask by means of a vacuum syphon, the temperature of about 50° C. and nitrogen gas purging being maintained meanwhile. Caution must always be exercised to prevent the selenourea solution from contacting and reacting with the oxygen in the air. The slurry remaining in the reaction flask is then rinsed twice with about 250 ml. portions of hot, freshly boiled water. The filtered solution, still under nitrogen, is then added to the selenourea drawn off by syphoning and the total is neutralized with sulfuric acid to a pH of about 4.0 while stirring to remove any hydrogen selenide vapors. Thereafter the pH of the solution is adjusted to about 6.2 by the addition of sodium carbonate solution. As a final precaution it is preferred to boil the selenourea solution under vacuum for a few minutes to insure removal of any excess unreacted hydrogen selenide.

After further filtration, the neutralized solution of selenourea thus obtained is then allowed to crystallize by maintaining the solution for 10 to 12 hours in a refrigerator at about 5° C. Further purification of the crystals of selenourea thus formed is advisable by recrystallization. As a final check on the purity of the crystals for heavy metal (selenium) content, about 2 ml. of a solution of dithizone (1 mg.) in chloroform (100 ml.) is added to a solution of 1 gram of selenourea in 25 ml. of de-aired water. The dithizone solution should remain green or slightly olive in hue; a pink or purple solution indicates the presence of undesirable heavy metal.

PREPARATION OF LEAD ACETATE

The purification of lead acetate is achieved by dissolving about 5 lbs. of commercially pure lead acetate in two liters of a 0.15 M solution of acetic acid and adding selenourea, obtained as just described, thereto in an amount equal to one gram of selenourea per 100 grams of dissolved lead. The solution is boiled until the coagulation of lead selenide ceases. In this process the lead acetate reacts with the selenourea. The coagulation of lead selenide tends to carry any copper present out of the solution. This process is repeated as long as copper continues to be present which is detected by testing with dithizone in carbon tetrachloride. The lead acetate solution is finally allowed to crystallize in a refrigerator, the crystals subsequently being dried in a vacuum oven at about 70° C. for 12 hours, for example.

DEPOSITION SOLUTIONS

Two different deposition solutions and procedures are employed according to the invention depending upon the ultimate characteristics of the infrared detector cells to be produced. The first procedure is designed to provide cells which may be successfully operated at ambient temperatures, while the second procedure results in cells most useful when operated at extremely low temperatures such as the temperature of liquid nitrogen, for example. The solutions described hereinafter are aqueous solutions unless otherwise designated.

Solution I

A suitable bath for the initial deposit of lead selenide polycrystalline films for cells to be operated at ambient temperatures comprises a solution of selenourea having a molarity of from 0.1 to 1.0 and a solution of lead acetate, having a volumetric and concentration relationship to the volume and concentration of selenourea solution so as to provide a lead-to-selenium ion ratio in the final solution of not less than 3:1 and preferably a ratio of 5:1. It will be understood that the lead-to-selenium ion ratio may be established by varying the concentrations of the selenourea and/or lead acetate solutions and by varying the volumetric proportions of each as will be demonstrated in the following examples.

The solutions of selenourea and lead acetate at mixing may be at 25° C. and 30° C., respectively, in which case the final temperature of the solution after mixing may be about 27.5–28° C. These temperatures are preferred inasmuch as the lead actate solution when saturated at 30° C. tends to crystallize out at temperatures substantially below 30° C. The concentration of the selenourea solution may be successfully varied between about 0.1 to 1.0 mol. Higher or lower concentrations of selenourea are characterized by greater difficulties in controlling the desired reactions with the lead acetate. Hence, the 0.3 mol selenourea solution is preferred because the greatest degree of control is obtained. Lower concentrations are marked by a slower formation of lead selenide film which, it is believed, results in exceptionally larger crystallites of lead selenide with an attendant poor adherence to the substrate.

In preparing a suitable solution of selenourea from the crystals obtained as described previously, the pH of the solution may be adjusted by the addition of dilute acetic acid or sodium carbonate, for example, to be between 5 and 6, preferably 5.5.

It is preferable to employ a saturated solution of lead acetate in order to provide the maximum amount of lead acetate for complete reaction with the selenourea. Lower concentrations of lead acetate are accompanied by the same formation of large, poorly adherent crystallites and by the occlusion of elementary selenium. Optimum results are obtained by employing a 0.3 mol solution of selenourea and a saturated solution (about 1.5 molarity) of lead acetate in volumetric proportions to provide a lead-to-selenium ion ratio of not less than 3:1 and preferably 5:1.

EXAMPLE A 16.6 gs. of selenourea crystals, obtained as described previously, are dissolved in 450 ml. of boiling deionized water through which carbon dioxide has been bubbled for at least 15 minutes just prior to the addition of selenourea. The solution is maintained thereafter at about 25° C.

512.1 gs. of lead acetate crystals, obtained as previously described, are dissolved in 900 ml. of deionized water. (It may be necessary to raise the temperature to about 50° C. in order to effect complete solution.) The solution is thereafter maintained at about 30° C.

15 ml. of the 0.3 mol selenourea solution just described is then mixed with 15 ml. of the 1.5 mol lead acetate solution. The lead-to-selenium ion ratio in this solution is about 5:1.

EXAMPLE B

Solutions of selenourea and lead acetate are made up as described in connection with Example A except that 5.53 gs. of selenourea are dissolved in 450 ml. of deionized water giving a 0.1 mol solution of selenourea. Thereafter 15 ml. of the selenourea solution is mixed with 5 ml. of the 1.5 mol lead acetate solution so as to provide a lead-to-selenium ion ratio of about 5:1 in this solution.

EXAMPLE C

Solutions of selenourea and lead acetate are made up as described in connection with Example A except that 55.3 gs. of selenourea are dissolved in 450 ml. of deionized water to give a 1.0 mol solution of selenourea. Thereafter 15 ml. of the selenourea is mixed with 45 ml. of the 1.5 mol lead acetate solutions to give a lead-to-selenium ion ratio of 3:1.

EXAMPLE D

Solutions of selenourea and lead acetate are made up as described in connection with Example A except that 341.4 gs. of lead acetate are dissolved in 900 ml. of deionized water to give a 1.0 mol solution of lead acetate. 15 ml. of the 0.3 mol solution of selenourea and 22.5 ml. of the 1.0 mol solution of lead acetate are mixed together to give a lead-to-selenium ion ratio of 5:1.

Solution II

A bath suitable for the second deposit of a lead selenide polycrystalline layer for cells to be operated at ambient temperatures and for the first and second deposits of lead selenide polycrystalline films for cells to be operated at subambient temperatures comprises solutions of selenourea and lead acetate as described under Solution I and exemplified in Examples A–D to which solutions are added a gelatin solution and a potassium tri-iodide solution.

The iodine, potassium iodide, and gelatin employed in this bath are commercially available from the J. T. Baker Company of Los Angeles, California, of sufficient purity to be satisfactory in the solutions of the invention.

The presence of iodine in the deposited lead selenide film or films, by a mechanism not fully understood at present, results in maximum sensitization and stabilization of the lead selenide for infrared detector purposes. Hence, it is desired to introduce iodine in the deposition solution to insure a thorough distribution thereof with the deposited lead selenide.

Preferably, the potassium tri-iodide solution has such a concentration and is added in such proportion to the selenourea and lead acetate bath as to provide a lead-to-iodide ion ratio of about 70:1 although ratios of about 25:1 to 300:1 may be employed satisfactorily. Exceeding a lead-to-iodide ion ratio of about 300:1 appears to result in a reaction between the iodine and the lead which is not desired.

The purpose of the gelatin is to provide a protective colloid in the solution for the selenourea to retard the action between the lead acetate and the selenourea and to prevent an undesired reaction between the iodine and the lead acetate. While the amount of gelatin actually employed is not critical, it will be appreciated that too much may unduly retard the reaction resulting in practically no formation of lead selenide. In general solutions of gelatin having a concentration of about 1.2 gs. per 100 ml. of water mixed in a ratio of about 1 part for each 20 parts by volume of the deposition solution is satisfactory. In actual practice satisfactory lead selenide layers have been achieved with solutions from which gelatin was omitted altogether. Hence, it is preferred to employ the gelatin in the deposition solutions because a superior formation of the lead selenide layer is achieved therewith.

It should also be understood that the same considerations as to the temperatures and concentrations of selenourea and lead acetate described in connection with Solution I likewise are applicable to Solution II.

EXAMPLE E 0.3 g. of gelatin powder is dissolved in 25 ml. of boiling deionized water. About 1.25 gs. of potassium iodide are dissolved first in 5 ml. of deionized water to which about 1.27 gs. of iodine are added and dissolved; thereafter about 20 ml. of deionized water is added to bring the potassium tri-iodide solution up to about 25 ml. This results in a 0.25 mol solution of $KI_3$.

1.5 ml. of the gelatin solution is then mixed with 15 ml. of a 1.5 molar lead acetate solution described in connection with Example A, after which 15 ml. of the 0.3 molar selenourea solution, previously described, is added. The final addition is 1.5 ml. of the potassium tri-iodide prepared as described above which gives a lead-to-iodide ion ratio of about 70:1.

DEPOSITION PROCEDURE

Referring now to the drawing, apparatus is shown which may be advantageously employed to carry out the deposition procedure to be hereinafter described. A substrate member 2 of glass, for example, is mounted across the bottom end of an open-ended container 4. The substrate member 2 is secured to the container 4 by means of the clamp rods 6, 7, 8 and 9 having inwardly and upwardly turned lower ends. The upper ends of the clamp rods 6, 7, 8 and 9 are mounted in apertured outwardly extending tabs 10, 11, 12 and 13 and are held in the extreme vertical position with respect to the container by means of the springs 14, 15, 16 and 17 so that the substrate member 2 is secured thereby in substantially watertight relationship with the container 4.

Figure 3:
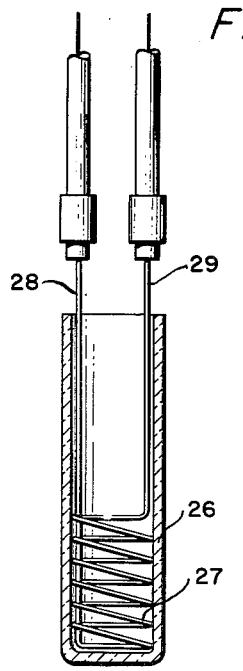
FIG. 3 is an elevational, partially sectional view of a heater element for use in the apparatus of FIG. 1.
Figure 2:
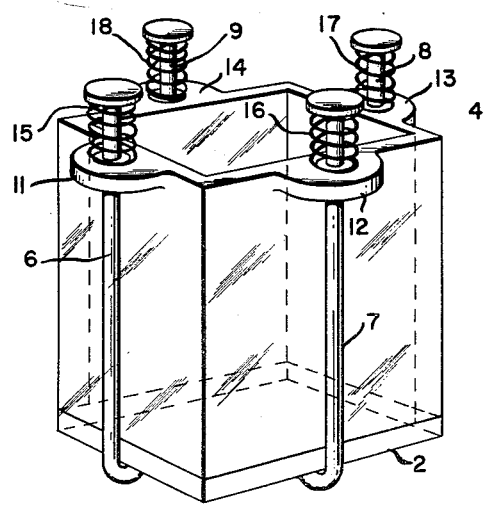
FIG. 2 is a perspective view of a container mounting for a substrate as employed in the apparatus of FIG. 1.

As shown in FIG. 1, the container 4 with the substrate member 2 secured to the lower end thereof is inserted into the vessel 20 and secured in position by means of the clamp 22. The container 4 may then be filled with the water 24. The hollow rod 26, shown in more detail in FIG. 3, is inserted down into the container 4. The hollow rod 26, which may be of quartz, for example, contains a Nichrome heater wire 27 adapted to be connected to a source of power by means of the leads 28 and 29. In this manner the water 24 surrounding the hollow tube 26 may be heated so as to maintain the substrate member 2 and portions of the deposition solution 30 immediately adjacent the substrate surface vessel 20 at any predetermined temperature. A magnetic stirrer element 32 is disposed in the bottom of the vessel 20 and may be rotated or otherwise actuated by another magnetic element (not shown) mounted outside and beneath the vessel 20 on the shaft of an electric motor, for example.

An infrared detector cell for use at ambient temperatures may be prepared as follows. A deposition solution as described in Example A is added to the vessel 20 to surround the substrate element 2 and its container mounting 4 as shown and described. The surface of the substrate element 2 to receive the lead selenide film is maintained about 1–2 mm. beneath the surface of the deposition solution. The deposition solution is preferably mixed at least a minute prior to addition to the vessel 20. At this point the temperature of the substrate and the immediately adjacent portions of the deposition solution is between 25° C.–28° C. After the deposition solution has been added, power is supplied to the heater element 27 and continuous stirring of the solution is maintained for 2 minutes. Thereafter for the next 18 minutes stirring is programmed so as to be "on" for 10 seconds for each minute, the direction of stirring being reversed for each "on" period. During the 20-minute deposition period the temperature of the substrate element and the adjacent portions of the deposition solution is raised uniformly from about 25° C.–28° C. at the start to about 75–90° C. at the end thereof. It is primarily intended to heat the substrate element 2 rather than the deposition solution since the substrate temperature affects the rate of crystallization of lead selenide and the size of the crystals formed. Too rapid a heating program causes the formation of large crystallites having poor adherence to the substrate while too slow a program results in unacceptably thin films. Initially, the heating program should be at the rate of about 5° C. per minute for the first 5–15 minutes tapering off to about 1° C. per minute for the terminal portion of the program or after a temperature of about 75° C. has been attained. Such a heating program maintains a desirable and practical plating or deposition rate as the deposition solution becomes depleted. By heating the substrate, preferential crystallization of the lead selenide on the substrate is achieved. Successful deposition does not depend upon particular temperature and schedules, lower temperatures or a constant temperature of about 30–35° C. merely requiring a much longer period to achieve deposition. The prime requisite is to maintain the temperature of the substrate slightly higher than the temperature of associated container surfaces in order to obtain preferential crystallization of lead selenide on the substrate.

The layer of lead selenide thus deposited provides a "seed" layer of lead selenide firmly adherent to the substrate upon which a relatively thicker layer of more sensitive lead selenide may be grown by deposition. After the first or "seed" layer of lead selenide has been deposited, the substrate 2 and the deposition vessel 20 are vigorously rinsed with deionized water and then re-mounted as before. The deposition solution described in Example E is then added to the vessel 20 as described in connection with this example. Thereafter, deposition of lead selenide with this new solution is effected following the same heating and stirring programs described, supra, to obtain the second layer of lead selenide. It should be realized that although the procedures described refer to a "first" and a "second" layer of lead selenide, upon the conclusion of the second deposition, the layers are indistinguishable from one another and to all intents and purposes constitute an integral layer. The ultimate thickness of the film of polycrystalline lead selenide obtained is slightly over one micron.

An infrared detector cell for use at lower than room temperatures, such as the temperature of liquid nitrogen, may be prepared as follows. The deposition solution described in Example E, containing gelatin and potassium tri-iodide, is added to the vessel 20 to surround the substrate element 2 and its container mounting 4 as described previously. Substantially the same steps and program of heating, stirring, and depositing are followed as described in connection with the preparation of cells for use at ambient temperatures. After the initial deposition has been completed and the vessel 20 and substrate element 2 have been rinsed in deionized water, a second deposition, with the same deposition solution as employed initially and as described in Example E, is made following substantially the same steps and program previously described. The resultant film of polycrystalline lead selenide is slightly less than one micron in thickness.

In either of the methods described, that is where Solution I is employed for the first deposition and Solution II for the second deposition or where Solution II is employed for both depositions, bubbling $CO_2$ through the lead acetate solutions just prior to preparing the deposition baths enhances the controllability and reproducibility of the process. This is believed due to the formation of a complex lead hydroxide carbonate which tends to slow the reaction with the selenourea so as to permit more orderly formation of lead selenide crystals. Hence, it is preferred to follow this practice although it is to be emphasized that the success of the methods of the invention is not dependent upon the treatment of the lead acetate with carbon dioxide. The $CO_2$ is bubbled through the lead acetate solution long enough to insure a complete reaction therewith; for example, bubbling $CO_2$ through 15 ml. of the 1.5 mol solution of lead acetate for several minutes is satisfactory to achieve the desired result. Those skilled in the art may readily determine the length of time for so treating lead acetate solutions of other volumes and concentrations.

SENSITIZATION

The cells thus prepared for low temperature operation are sensitized by placing them on glass wool pads in open dishes in a furnace and heating in air for approximately 12 minutes. The furnace temperature is not critical and may be maintained between 350° C. and 450° C. The best yield of cells most sensitive for low temperature operation is obtained when the furnace temperature is about 375° C.

Cells prepared for ambient temperature operation are sensitized in much the same manner by heating for about 10 minutes at temperatures between 350° C. and 450° C. followed by exposure of the cells to iodine or bromine vapors for approximately 7 seconds. This exposure to halide vapors appears to result in cells having more stable characteristics such as resistivity which increases between 1 and 3 orders of magnitude during the exposure period and remains constant thereafter. A more detailed description of this sensitization step may be found in the co-pending application, S.N. 784,806, and now abandoned, of the instant inventor filed concurrently herewith and assigned to the instant assignee.

There has thus been described methods for preparing by deposition infrared sensitive cells of lead selenide of much greater sensitivity than heretofore attainable. Methods for the preparation of selenourea suitable for use in the deposition procedures of the invention have also been described. The sensitivity of cells prepared according to the methods set forth herein has been found to exceed the sensitivity of lead selenide cells prepared by prior techniques. The methods described herein result in lead selenide cells having a mirror-like layer of polycrystalline lead selenide strongly adherent to a substrate.

What is claimed is:

1. The method of depositing lead selenide on a substrate comprising the step of immersing said substrate in a deposition bath of selenourea, lead acetate and potassium tri-iodide wherein the ion ratio of lead to selenium is from 3:1 to 5:1 and the ion ratio of lead to iodide is from 25:1 to 300:1.

2. The method according to claim 1 wherein said lead-to-selenium ion ratio is 5:1 and said lead-to-iodide ion ratio is 70:1.

3. The method of depositing lead selenide on a substrate comprising the step of immersing said substrate in a deposition bath of selenourea, lead acetate, and potassium tri-iodide wherein the ion ratio of lead to selenium is from 3:1 to 5:1 and the ion ratio of lead to iodide is from 25:1 to 300:1, and heating said substrate in said bath from ambient temperature up to a maximum temperature of about 90° C.

4. The method of depositing lead selenide on a substrate comprising the steps of: immersing said substrate in a first deposition solution of selenourea and lead acetate wherein the ion ratio of lead to selenium is from 3:1 to 5:1, and thereafter immersing said substrate in a second deposition solution of selenourea, lead acetate, and potassium tri-iodide, the ion ratio of lead to selenium being from 3:1 to 5:1 and the ion ratio of lead to iodide being from 25:1 to 300:1.

5. The method of depositing lead selenide on a substrate comprising the steps of: immersing said substrate in a first deposition solution of selenourea, lead acetate, and potassium tri-iodide, the ion ratio of lead to selenium being from 3:1 to 5:1 and the ion ratio of lead to iodide being from 25:1 to 300:1, thereafter immersing said substrate in a second deposition bath having substantially the same composition as said first deposition solution.

6. The method of depositing lead selenide on a substrate comprising the steps of: immersing said substrate in a first deposition solution of selenourea and lead acetate, the concentration of said selenourea being between 0.1 and 1.0 mol and the ion ratio of lead to selenium in said solution being between 3:1 and 5:1, thereafter immersing said substrate in a second deposition solution of selenourea, lead acetate and potassium tri-iodide, the concentration of said selenourea being between 0.1 and 1.0 mol, the ion ratio of lead to selenium being from 3:1 to 5:1, and the ion ratio of lead to iodide being from 25:1 to 300:1.

7. The method according to claim 6 wherein said second deposition solution includes not more than about one part by volume of a gelatin solution having a concentration of up to about 1.2 gs. per 100 mls. for each twenty parts by volume of deposition solution.

8. The method of depositing lead selenide on a substrate comprising the steps of: immersing said substrate in a first deposition solution of selenourea having a concentration between 0.1 and 1.0 mol, lead acetate, and potassium tri-iodide, the lead-to-selenium ion ratio in said solution being from 3:1 to 5:1, the lead-to-iodide ion ratio in said solution being from 25:1 to 300:1, and thereafter immersing said substrate in a second deposition bath having substantially the same composition as said first-named deposition solution.

9. The method according to claim 8 wherein said first and second deposition solutions include not more than one part by volume of a gelatin solution having a concentration of up to about 1.2 gs. per 100 mls. for each 20 parts by volume of said deposition solutions.

10. The method of depositing lead selenide on a substrate comprising the steps of: immersing said substrate in a deposition solution consisting essentially of selenourea having a concentration of 0.3 mol. enough lead acetate to provide an ion ratio of lead to selenium of from 3:1 to 5:1, and enough potassium tri-iodide to establish a lead-to-iodide ion ratio of from 25:1 to 300:1, and thereafter immersing said substrate in a second deposition solution having substantially the same composition as said first-named deposition solution.

11. The method according to claim 10 wherein said first and second deposition solutions include not more than about one part by volume of a gelatin solution having a concentration of about 1.2 gs. per ml. for each twenty parts by volume of deposition solution.

12. The method of depositing lead selenide on a substrate comprising the steps of: immersing said substrate in a deposition solution of selenourea having a concentration between 0.1 and 1.0 mol, enough lead acetate to establish a lead-to-selenium ion ratio of from 3:1 to 5:1, heating said substrate in said bath from ambient temperature to a temperature of at least 75° C., thereafter immersing said substrate in a second deposition solution of selenourea having a concentration between 0.1 and 1.0 mol, enough lead acetate to establish a lead-to-selenium ion ratio of from 3:1 to 5:1, enough potassium tri-iodide to establish a lead-to-iodide ion ratio of from 25:1 to 300:1, and not more than about one part by volume of a solution of gelatin having a concentration of up to 1.2 gs./100 mls., and heating said substrate to a temperature of at least 75° C.

13. The method of depositing lead selenide on a substrate comprising the steps of: immersing said substrate in a deposition solution of selenourea having a concentration between 0.1 and 1.0 mol, enough lead acetate to establish a lead-to-selenium ion ratio of from 3:1 to 5:1, enough potassium tri-iodide to establish a lead-to-iodide ion ratio of from 25:1 to 300:1, and not more than about one part by volume of a solution of gelatin having a concentration of up to 1.2 gs./100 mls. for each 20 parts by volume of solution, raising the temperature of said substrate in said bath from ambient temperature to at least 75° C., thereafter immersing said substrate in a second deposition solution having substantially the same composition as said first-named deposition solution, and raising the temperature of said substrate to at least 75° C.

14. A solution for depositing lead selenide onto a substrate consisting essentially of selenourea solution having a concentration between 0.1 and 1.0 mol, enough lead acetate to establish a lead-to-selenium ion ratio of from 3:1 to 5:1, enough potassium tri-iodide to establish a lead-to-iodide ion ratio of from 25:1 to 300:1, and not more than about 1 part by volume of a solution of gelatin having a concentration of up to 1.2 gs. per 100 mls. for each 20 parts by volume of said solution.

15. A bath for depositing lead selenide onto a substrate consisting essentially of 10 parts by volume of a 0.3 mol solution of selenourea, 10 parts by volume of a saturated solution of lead acetate, 1 part by volume of a 0.25 mol solution of potassium tri-iodide, and 1 part by volume of a solution of gelatin having a concentration of 1.2 mg./ml.

16. The method of preparing a long wavelength radiation sensitive device comprising the steps of: immersing a substrate in a first deposition bath consisting essentially of ten parts by volume of a 0.3 mol solution of selenourea, ten parts by volume of a saturated solution of lead acetate, one part by volume of a 0.25 mol solution of potassium tri-iodide, and one part by volume of a solution of gelatin having a concentration of 1.2 gs. per 100 mls., raising the temperature of said substrate from ambient temperature to at least 75° C. to form a first layer of predetermined thickness of lead selenide on said substrate, removing said substrate from said first bath, immersing said substrate into a second bath having substantially the same composition as said first bath, raising the temperature of said substrate to said first-named temperature to form a further layer of lead selenide on said first layer of lead selenide, removing said substrate from said second bath, and thereafter heating said substrate with said lead selenide deposited thereon in air to a temperature between 350° and 450° C.

17. The method of preparing a long wavelength radiation sensitive device comprising the steps of: immersing a substrate in a first deposition bath consisting essentially of ten parts by volume of a 0.3 mol solution of selenourea and ten parts by volume of a saturated solution of lead acetate, raising the temperature of said substrate from ambient temperature to at least 75° C. to form a first layer of predetermined thickness of lead selenide on said substrate, removing said substrate from said first bath, immersing said substrate into a second bath consisting essentially of ten parts by volume of a 0.3 mol solution of selenourea and ten parts by volume of a saturated solution of lead acetate, one part by volume of a 0.25 mol solution of potassium tri-iodide, and one part by volume of solution of gelatin having a concentration of 1.2 gs. per 100 mls., raising the temperature of said substrate to said first-named temperature to form a further layer of lead selenide on said first layer of lead selenide, removing said substrate from said second bath, and thereafter heating said substrate with said lead selenide deposited thereon in air to a temperature between 350° and 450° C.

References Cited by the Examiner

UNITED STATES PATENTS

| | | | |
|---|---|---|---|
| 2,408,116 | 9/46 | Von Hippel | 117—201 |
| 2,659,682 | 11/53 | Anderson | 117—34 XR |
| 2,867,542 | 1/59 | De Keyser et al. | 117—34 |
| 2,898,240 | 8/59 | Owen | 117—201 |

OTHER REFERENCES

Humphrey: Photoconductivity in Lead Selenide Thesis submitted to Faculty of the Graduate School of the University of Maryland in partial fulfillment of the requirements for the degree of Doctor of Philosophy, 1955, published by University Microfilms Inc., Ann Arbor, Michigan, Nov. 30, 1955, pp. 26, 32–36, 46–54.

RICHARD D. NEVIUS, *Primary Examiner.*

R. L. CAMPBELL, WILLIAM G. GILES, *Examiners.*